United States Patent
Hatta et al.

(10) Patent No.: US 9,486,966 B2
(45) Date of Patent: Nov. 8, 2016

(54) FILAMENT WINDING APPARATUS

(71) Applicant: TOYOTA JIDOSHA KABUSHIKI KAISHA, Toyota-shi, Aichi-ken (JP)

(72) Inventors: Ken Hatta, Okazaki (JP); Daigoro Nakamura, Kyoto (JP); Motohiro Tanigawa, Kyoto (JP)

(73) Assignees: Toyota Jidosha Kabushiki Kaisha, Toyota-shi, Aichi-ken (JP); Murata Machinery, Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 14/675,787

(22) Filed: Apr. 1, 2015

(65) Prior Publication Data

US 2015/0283753 A1   Oct. 8, 2015

(30) Foreign Application Priority Data

Apr. 4, 2014  (JP) .................................. 2014-077415

(51) Int. Cl.
| | |
|---|---|
| *B29C 53/56* | (2006.01) |
| *B29C 70/32* | (2006.01) |
| B29C 70/08 | (2006.01) |
| B29L 31/00 | (2006.01) |

(52) U.S. Cl.
CPC ............. *B29C 70/32* (2013.01); *B29C 53/562* (2013.01); *B29C 70/086* (2013.01); *B29L 2031/712* (2013.01); *B29L 2031/7154* (2013.01)

(58) Field of Classification Search
CPC ... B29C 53/562; B29C 70/32; B29C 70/086; B29L 2031/712
See application file for complete search history.

(56) References Cited

U.S. PATENT DOCUMENTS

2009/0065622 A1*  3/2009  Uozumi .................. B29C 53/70
                                                                242/410
2013/0256447 A1* 10/2013  Tanigawa .............. B29C 53/602
                                                                242/419.1

FOREIGN PATENT DOCUMENTS

| JP | H8-276504 A | 10/1996 |
|---|---|---|
| JP | 2007-190697 | 8/2007 |
| JP | 2011-93276 | 5/2011 |
| JP | 2011-245744 | 12/2011 |
| WO | WO 2012/066851 A1 * | 5/2012 |

* cited by examiner

*Primary Examiner* — Jacob T Minskey
*Assistant Examiner* — Vishal I Patel
(74) *Attorney, Agent, or Firm* — Finnegan, Henderson, Farabow, Garrett & Dunner, LLP (57) ABSTRACT

A filament winding apparatus includes a hoop winding unit that is configured to hoop wind a plurality of fiber bundles on an outer surface of a liner of a tank by rotating along a circumferential direction of the liner while moving back and forth along an axial direction of the liner. The hoop winding unit includes a fiber-bundle guide assembly that is configured to rotate along the circumferential direction of the liner during the moving back and forth of the hoop winding unit, and to guide the plurality of fiber bundles to the outer surface of the liner. The fiber-bundle guide assembly has a first fiber-turn section configured to change a moving direction of the plurality of fiber bundles from an approach direction to a turned direction perpendicular to the approach direction, wherein the plurality of fiber bundles are supplied to the fiber-bundle guide assembly in the approach direction with a state where the plurality of fiber bundles are arrayed in parallel with each other in a width direction perpendicular to the approach direction.

2 Claims, 6 Drawing Sheets

FILAMENT WINDING APPARATUS

CROSS-REFERENCE TO RELATED APPLICATIONS

The present application claims the priority based on Japanese Patent Application No. 2014-077415 filed on Apr. 4, 2014, the disclosure of which is hereby incorporated by reference in its entirety.

BACKGROUND OF THE INVENTION

1. Field of the Invention

The present invention relates to a filament winding apparatus.

2. Description of Related Art

There is a known technique for manufacturing a high-pressure gas tank, called filament winding method (hereinafter also called "FW method"). The FW method winds fibers which are impregnated in advance with a thermosetting resin (hereinafter also called "resin-impregnated fibers") on a liner as a core of a high-pressure gas tank, and thermally cures the thermosetting resin to manufacture the high-pressure gas tank. Employing the FW method allows formation of the high-pressure gas tank having a high-strength fiber reinforced resin layer formed on the surface of the liner. In fabrication of the high-pressure gas tank by the FW method, a filament winding apparatus (hereinafter called as "FW apparatus") is widely used to wind fiber bundles of the resin-impregnated filaments on the liner of the tank. For example, JP2007-190697A describes a FW apparatus having a wind-up assembly, which includes a fiber-bundle guide assembly configured to be movable relative to the liner of the tank to guide the rein-impregnated fiber bundles, and serves to successively wind the resin-impregnated fibers on the liner. In this FW apparatus, the resin-impregnated fibers with an appropriate tensile force are successively wound on the liner by the fiber-bundle guide assembly, which includes a tension roller configured to apply the appropriate tensile force to the resin-impregnated fibers, and a load measurement unit configured to measure a reactive force applied to the tension roller by the resin-impregnated fibers. The fiber-bundle guide assembly has a widening roller in a drum-like convex shape configured to apply a tensile force to each of a plurality of bundles of the resin-impregnated fibers drawn by the fiber-bundle guide assembly both in a length direction of the fibers and in a width direction perpendicular to the length direction, a narrowing roller in a concave shape configured to unspread the plurality of bundles of the resin-impregnated fibers passing through the widening roller and reduce the interval between the adjacent bundles of the resin-impregnated fibers, and an adjustment port configured to guide the plurality of bundles of the resin-impregnated fibers passing through the narrowing roller to the liner.

SUMMARY

With respect to the fiber-bundle guide assembly of JP 2007-190697A described above, however, the motion of the fiber-bundle guide assembly relative to the liner is likely to change the tensile force applied in the length direction and in the width direction of the resin-impregnated fibers discharged toward the liner, thereby causing a insufficient tensile force. The insufficient tensile force may cause, for example, a slack, a twist, an insufficient width expansion or a bias of the resin-impregnated fibers that are to be wound on the liner and may lead to unstable winding of the resin-impregnated fibers on the liner. This is likely to degrade the performance of the resulting high-pressure gas tank. With regard to the FW apparatus, other needs include downsizing, cost reduction, resource saving, easy manufacture and improvement of the usability.

According to an aspect of the present invention, there is provided a filament winding apparatus which winds fiber bundles on an outer surface of a liner of a tank. The filament winding apparatus includes a hoop winding unit that is configured to hoop wind a plurality of fiber bundles on the outer surface of the liner of a tank by rotating along a circumferential direction of the liner while moving back and forth along an axial direction of the liner. The hoop winding unit includes a fiber-bundle guide assembly that is configured to rotate along the circumferential direction of the liner during the moving back and forth of the hoop winding unit, and to guide the plurality of fiber bundles to the outer surface of the liner. The fiber-bundle guide assembly has a first fiber-turn section configured to change a moving direction of the plurality of fiber bundles from an approach direction to a turned direction perpendicular to the approach direction, wherein the plurality of fiber bundles are supplied to the fiber-bundle guide assembly in the approach direction with a state where the plurality of fiber bundles are arrayed in parallel with each other in a width direction perpendicular to the approach direction.

The invention may be implemented by any of various aspects other those described above: for example, a fiber-bundle guide, a hoop winding unit including the fiber-bundle guide and a filament winding apparatus including the hoop winding unit.

DESCRIPTION OF EMBODIMENTS

A filament winding apparatus (FW apparatus) according to one embodiment of the invention described below is used to manufacture a high-pressure gas tank as a final product, and serves to wind resin-impregnated fiber bundles on a liner as a core of the high pressure gas tank.

Figure 1:
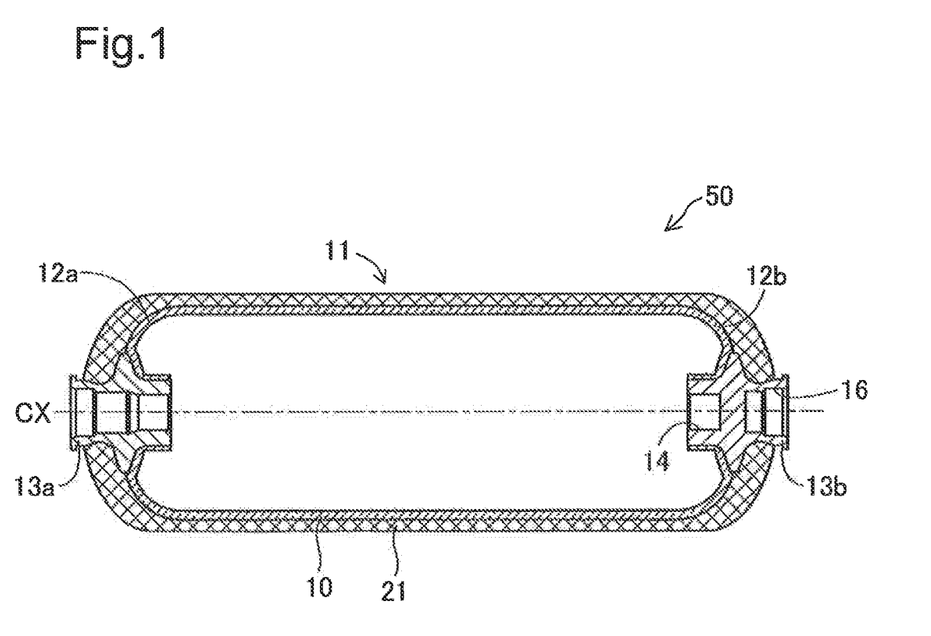
FIG. 1 is a schematic cross sectional view illustrating a high-pressure gas tank as a final product manufactured by using a filament winding apparatus according to one embodiment of the invention, taken on a cutting plane passing through a center axis.

FIG. 1 is a schematic cross sectional view illustrating a high-pressure gas tank 50 as a final product manufactured by using a filament winding apparatus according to one embodiment of the invention, taken on a cutting plane passing through a center axis CX. According to this embodiment, the high-pressure gas tank 50 may be, for example, a high-pressure hydrogen tank configured to store high-pressure hydrogen.

The high-pressure gas tank 50 includes a liner 10 with metal caps 13a and 13b, and fiber-reinforced resin layers 21. The liner 10 includes a body section 11 in an approximately cylindrical shape formed in a center area, and two dome sections 12a and 12b each in an approximately semispherical shape continuously formed at the respective ends of the body section 11. The liner 10 is a container made of, for example, an aluminum material or a stainless steel material having high strength or a resin material having gas barrier property against hydrogen. The first metal cap 13a, made of a metal, is provided on an edge of the dome section 12a on the front end of the liner 10. The first metal cap 13a serves as a piping or a connector for introducing the gas into the liner 10. The first metal cap 13a is also used to allow an shaft of the filament winding apparatus (described later) to pass through into the liner 10 when the liner 10 is mount on the filament winding apparatus. The second metal cap 13b, made of a metal, is provided on an edge of the other dome section 12b on the back end of the liner 10. The second metal cap 13b is used as a fixing fitting or an engagement fitting when the liner 10 is mount on the filament winding apparatus. In the example of FIG. 1, the second metal cap 13b is provided a first engagement hole 14 in the inside, and a second engagement hole 16 at the outside. The first engagement hole 14 is to be engaged with a shaft of the filament winding apparatus. The second engagement hole 16 is to be engaged with another shaft of the filament winding apparatus. These engagement holes 14 and 16 may be provided with internal screws, respectively, to be engaged with external screws of the shafts. The two engagement holes 14 and 16 are not in communication with each other so that the dome section 12b is sealed by the second metal cap 13b. The fiber-reinforced resin layers 21 are provided to increase the strength of the tank. The fibers constituting the fiber-reinforced resin layers 21 are resin-impregnated fibers obtained by impregnating carbon fibers in advance with a thermosetting resin such as an epoxy resin. The material of the carbon fibers may be, for example, rayon-based carbon fibers, polyacrylonitrile (PAN)-based carbon fibers or pitch-based carbon fibers.

Figure 2:
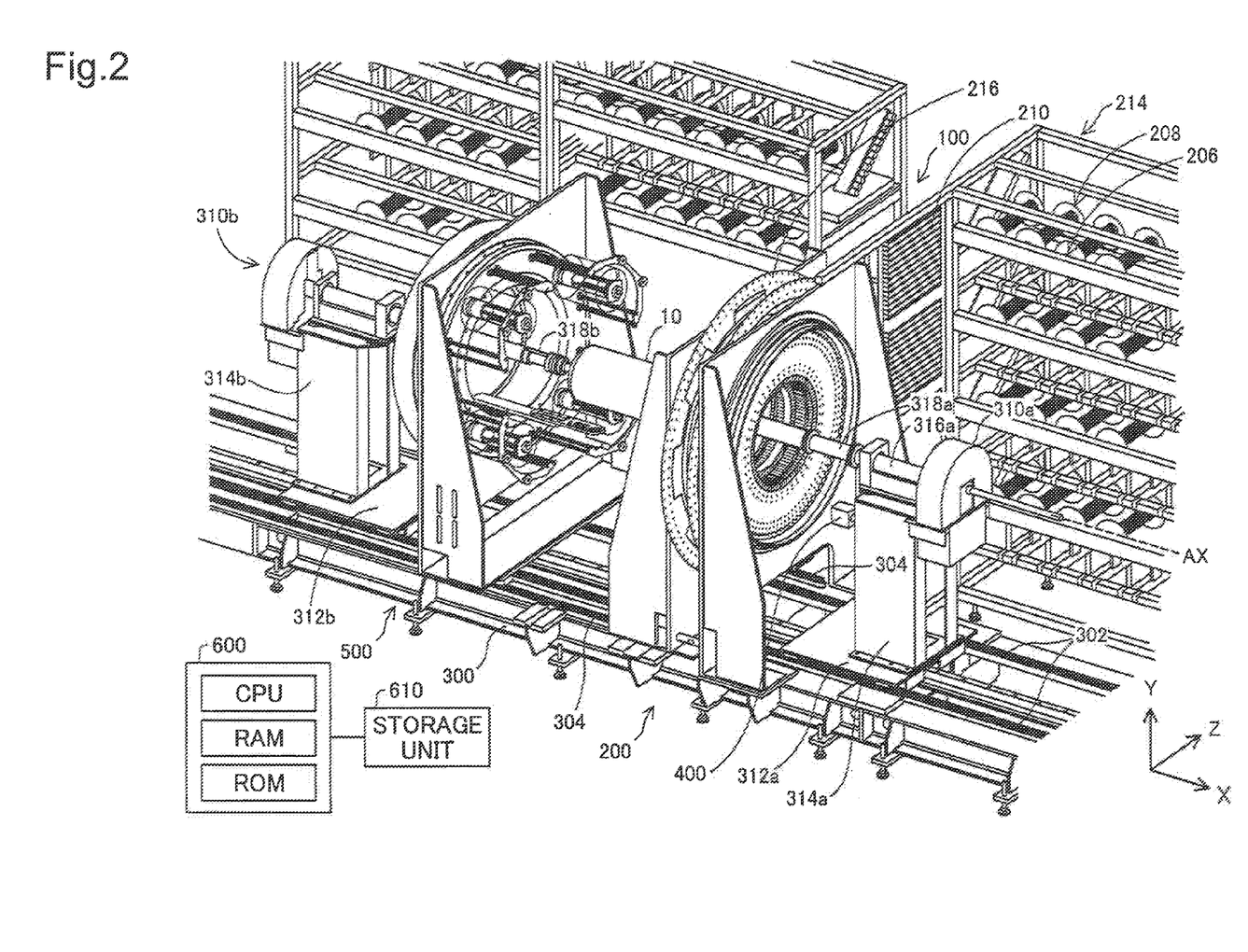
FIG. 2 is a diagram illustrating the schematic configuration of a filament winding apparatus according to one embodiment of the invention.

FIG. 2 is a diagram illustrating the schematic configuration of a filament winding apparatus 100 according to one embodiment of the invention. For the better understanding of the description, XYZ axes orthogonal to one another are shown in FIG. 2. The same applies to subsequent diagrams.

The FW apparatus 100 includes a helical winding unit 200, a hoop winding unit 500, a controller 600, a storage unit 610, a data acquisition unit 400 and a base 300.

The controller 600 is a control unit used to control the respective units or components of the FW apparatus 100. The controller 600 includes a CPU, a RAM and a ROM used for controlling the respective units or components. The controller 600 controls the respective units or components of the FW apparatus 100, so as to wind the resin-impregnated fiber bundles at a desired position on the liner 10 with a desired tensile force. The storage unit 610 stores various control data used to control the respective units or components of the FW apparatus 100.

The helical winding unit 200 and the hoop winding unit 500 are installed on the base 300. The base 300 has a first guide groove unit 302, a second guide groove unit 304 and two support units 310a and 310b. The first guide groove unit 302 has a pair of grooves extended in the longitudinal direction (X-axis direction) of the base 300. The support units 310a and 310b are used to support the liner 10 therebetween. The support units 310a and 310b are movable on the first guide groove unit 302 along the longitudinal direction (X-axis direction) of the base 300 by a drive mechanism (not shown) controlled by the controller 600. Moving the support units 310a and 310b on the first guide groove unit 302 causes the liner 10 supported by the two support units 310a and 310b to be moved relative to the helical winding unit 200.

The second guide groove unit 304 has a pair of grooves extended in the longitudinal direction (X-axis direction) of the base 300. The hoop winding unit 500 is movable on the second guide groove unit 304 along the longitudinal direction (X-axis direction) of the base 300 by a drive mechanism (not shown) controlled by the controller 600.

The support units 310a and 310b are configured to support the liner 10. The first support unit 310a includes a movable body 312a, a support column 314a, a chuck 316a and a shaft 318a. The chuck 316a of the first support unit 310a holds the first metal cap 13a (FIG. 1) of the liner 10. The shaft 318a of the first support unit 310a passes through the first metal cap 10a of the liner 10, and engages with the engagement hole 14 at the inside of the second metal cap 13b. The second support unit 310b includes a movable body 312b, a support column 314b, and a shaft 318b. The shaft 318b of the second support unit 310b engages with the engagement hole 16 at the outside of the second metal cap 13b of the liner 10. The shafts 318a and 318b may be provided with external screws at their ends, respectively. These shafts 318a and 318b are connected with a drive mechanism (not shown) for rotating the shafts 318a and 318b about the center axis CX of the liner 10. According to this embodiment, a center axis AX of the shafts 318a, 318b is aligned with the center axis CX of the liner 10.

The helical winding unit 200 is a device configured to helical wind the resin-impregnated fibers in the form of fiber bundles on the liner 10. The helical winding denotes a winding technique of winding fiber bundles on the liner 10 so as to cover the body section 11 and the dome sections 12 on both ends at a predetermined angle with respect to the axial direction of the liner 10. Helical winding of the fiber bundles on the liner 10 increases the strength of the liner 10 in the axial direction (X-axis direction) of the liner 10.

The helical winding unit 200 includes a plurality of holders 206, a plurality of bobbins 208, a tension applying unit 210, a shelf 214 and a helical winding head 216. As shown in FIG. 2, the holders 206 are placed on the shelf 214, and the holders 206 have the bobbins 208 with the fiber bundles of the resin-impregnated fiber wound thereon.

The tension applying unit 210 is provided between the shelf 214 and the helical winding head 216 to apply a predetermined tensile force to the fiber bundles of the resin-impregnated fibers. The fiber bundles of the resin-impregnated fibers having the predetermined tensile force applied by the tension applying part 210 are wound by the helical winding head 216 on the liner 10. In this embodiment, the fiber bundles of the resin-impregnated fibers are fed from the bobbins 208 through the tension applying unit 210 on the helical winding head 216. For convenience of illustration, however, the fiber bundles on the helical winding head 216 are not illustrated.

The hoop winding unit 500 is a device configured to hoop winding the fiber bundles of the resin-impregnated fibers on the liner 10. The hoop winding denotes a winding technique of winding the fiber bundles on the liner 10 so as to cover the body section 11 at an angle approximately perpendicular to the axial direction of the liner 10. Hoop winding of the fiber bundles of the resin-impregnated fibers on the liner 10 increases the strength of the liner 10 in the radial direction (Y-axis direction) of the liner 10.

Figure 3:
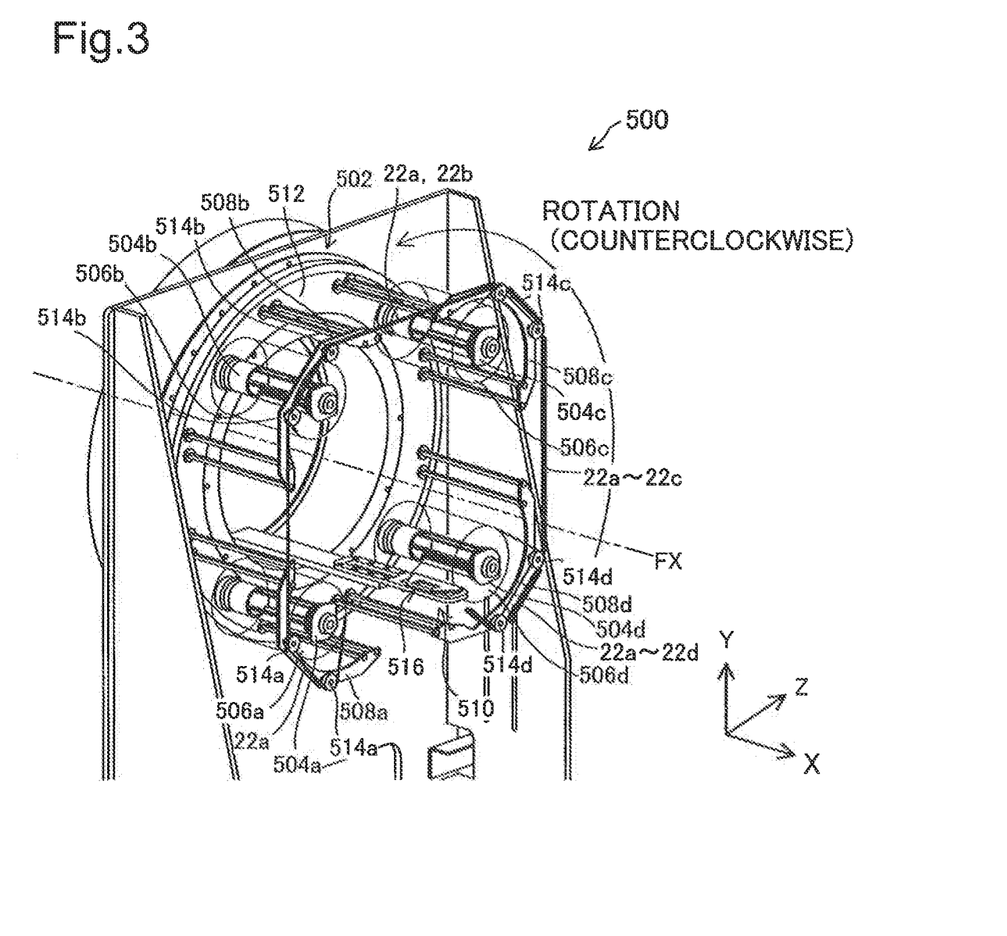
FIG. 3 is an enlarged diagram illustrating the general configuration of a main part of a hoop winding unit.

FIG. 3 is an enlarged diagram illustrating the schematic configuration of a main part of the hoop winding unit 500. The hoop winding unit 500 includes a hoop winding head 502, a plurality of holders 504 (504a-504d), a plurality of bobbins 506 (506a-506d), a plurality of guide members 508 (508a-508d) and a fiber-bundle guide assembly 510. The following description is made on the hoop winding unit 500 viewed from the helical winding unit 200 (see FIG. 2).

The hoop winding head 502 is a rotary member in a cylindrical shape configured to rotate counterclockwise in FIG. 3 about a center axis FX aligned with the center axis AX of the shaft 318 by a drive mechanism (not shown). The plurality of holder 504 are placed along the annular circumference on an annular plate 512 facing the X-axis direction of the hoop winding head 502. The plurality of guide members 508 are provided in one-to-one correspondence to the respective holders 504 and are placed to surround an outer part of the respective holders 504 along the annular circumference on the annular plate 512.

The respective holders 504 are devices configured to hold the bobbins 506 in a rotatable manner about an axial center parallel to the X-axis direction. Fiber bundles 22 (22a-22d) of resin-impregnated fibers are wound on the respective bobbins 506 held on the respective holders 504. The fiber bundles 22 wound on the respective bobbins 506 are drawn from the respective bobbins 506 with rotations of the respective bobbins 506.

The guide members 508 respectively have a pair of guide roller elements 514 (514a-514d) placed along the annular circumference to guide the fiber bundles 22 (22a-22d) drawn from the respective bobbins 506 along the annular circumference to the fiber-bundle guide assembly 510.

According to this embodiment, one holder 504, one bobbin 506 and one guide member 508 constitute one set of devices, and four sets of the devices are provided on the annular plate 512 of the hoop winding head 502. The respective sets rotate counterclockwise about the center axis FX accompanied with rotation of the hoop winding head 502. In the description below, when there is a need to distinguish the respective sets and their components, the respective sets and the components are referred to with ordinal numbers, i.e., "first" to "fourth" as the prefix and with alphabetic symbols, i.e., "a" to "d" as the suffix, sequentially counterclockwise from the position of the fiber-bundle guide assembly 510. For example, the bobbins 506 are called first bobbin 506a, second bobbin 506b, third bobbin 506c and fourth bobbin 506d in the sequence of the lower left, the upper left, the upper right and the lower right.

The fiber-bundle guide assembly 510 is protruded between the first guide member 508a and the fourth guide member 508d along the direction of the center axis FX (X-axis direction) toward the front side of the annular plate 512 (toward the helical winding unit 200). The fiber-bundle guide assembly 510 is provided with a turn guide unit 516 (described later) having function of folding back the fiber bundles 22 at its end portion. The structure and function of the turn guide unit 516 will be described later.

The first fiber bundle 22a drawn from the first bobbin 506a is guided to the second guide member 508b via the two first guide roller elements 514a placed on the first guide member 508a.

The second fiber bundle 22b drawn from the second bobbin 506b is similarly guided to the third guide member 508c via the two second guide roller elements 514b placed on the second guide member 508b. The second guide roller elements 514b are arranged to have two-tier rollers (not shown) tiered in the axial direction (X-axis direction). The two-tier rollers guide the first fiber bundle 22a guided from the first guide member 508a as well as the second fiber bundle 22b in parallel to the third guide member 508c.

The third fiber bundle 22c drawn from the third bobbin 506c is similarly guided toward the fourth guide member 508d via the two third guide roller elements 514c placed on the third guide member 508c. The third guide roller elements 514c are arranged to have three-tier rollers (not shown) tiered in the axial direction (X-axis direction). The three-tiered rollers guide the first fiber bundle 22a and the second fiber bundle 22b guided from the second guide member 508b as well as the third fiber bundle 22c in parallel to the fourth guide member 508d.

The fourth fiber bundle 22d wound on the fourth bobbin 506d is guided to the fiber-bundle guide assembly 510 via the two fourth guide roller elements 514d placed on the fourth guide member 508d. The fourth guide roller elements 514d are arranged to have four-tier rollers (not shown) tiered in the axial direction (X-axis direction). The four-tier rollers guide the first to the third fiber bundles 22a-22c guided from the third guide member 508c as well as the fourth fiber bundle 22d in parallel to the fiber-bundle guide assembly 510.

As described above, the fiber bundles 22a-22d drawn from the first to the fourth bobbins 506a-506d are guided along the circumferential direction of the hoop winding head 502 to the fiber-bundle guide assembly 510 by the first to the fourth guide roller elements 514a-514d.

Figure 4:
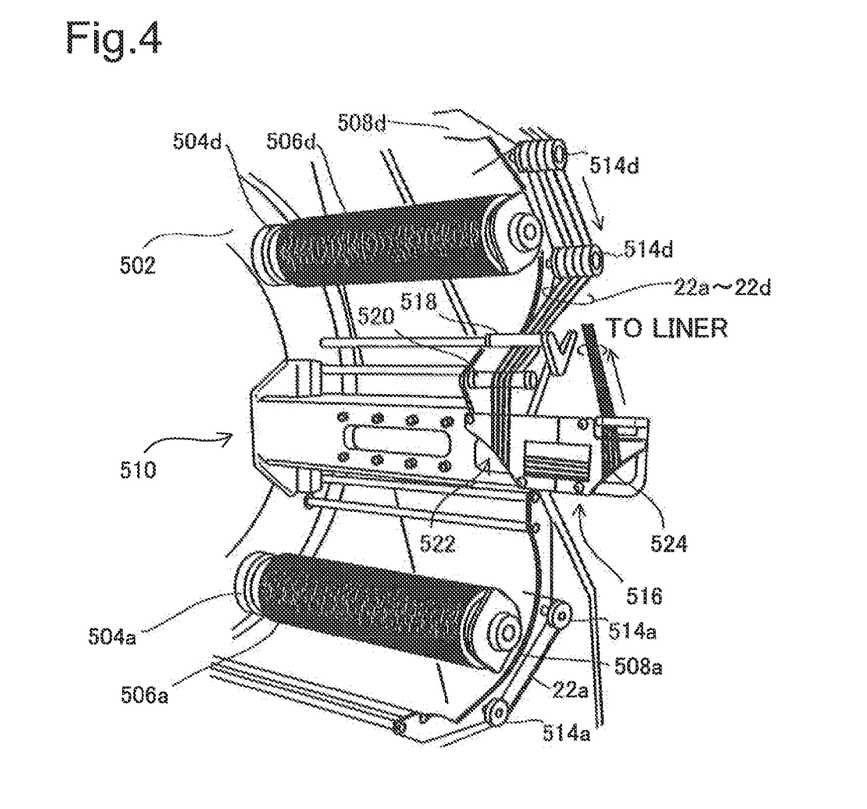
FIG. 4 is an enlarged diagram illustrating a peripheral area of FIG. 3 including a fiber-bundle guide assembly.

FIG. 4 is an enlarged diagram illustrating a peripheral area including the fiber-bundle guide assembly 510 of FIG. 3. For the purpose of better understanding of the configuration of the fiber-bundle guide assembly 510, FIG. 4 shows the state where the hoop winding head 502 is rotated counterclockwise by 90 degrees from that of FIG. 3. The fiber-bundle guide assembly 510 includes a guide shaft 518, a slack suppressing shaft 520 and a turn guide unit 516. The fiber bundles 22 (22a-22d) drawn from the fourth guide roller elements 514d of the fourth guide member 408d are guided via the guide shaft 518 and the slack suppressing shaft 520 to the turn guide unit 516, and their advancing direction is turned back by 180 degrees to go toward the liner 10 as described later.

The fiber-bundle guide assembly 510 rotates counterclockwise about the center axis FX accompanied with the rotation of the hoop winding head 502 (See FIG. 3). The liner 10 rotates clockwise, which is opposite to the direction of the rotation of the fiber-bundle guide assembly 510, by a drive mechanism (not shown) provided on the support units 310a and 310b. The fiber bundles 22a-22d on the first to the fourth bobbins 506a-506d placed on the annular plate 512 of the hoop winding head 502 are accordingly guided in parallel to the liner 10 via the fiber-bundle guide assembly 510 to be wound on the liner 10.

The hoop winding unit 500 is movable on the second guide groove unit 304 along the longitudinal direction (X-axis direction) of the base 300 by the drive mechanism (not shown) controlled by the controller 600. This adjusts the winding position of the fiber bundles 22 on the liner 10.

As described above, the hoop winding unit 500 is driven to hoop wind the fiber bundles 22 of the resin-impregnated fibers on the body section 11 of the liner 10.

Figure 5:
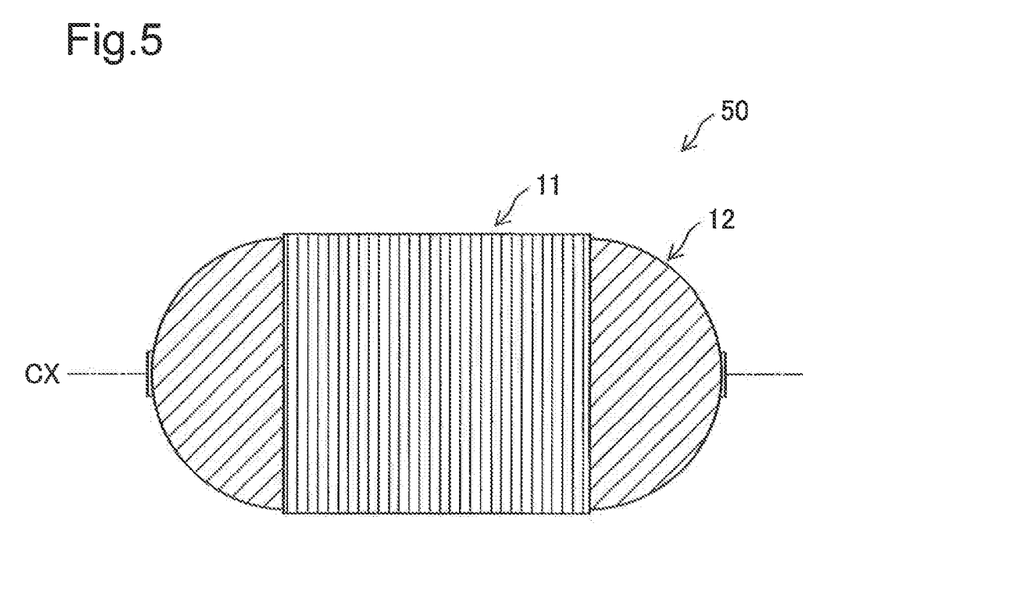
FIG. 5 is a diagram illustrating a tank having fiber bundles wound thereon.

FIG. 5 is a diagram illustrating the tank 50 having the fiber bundles 22 wound on the liner 10. The body section 11 and the dome sections 12 are provided with the helical winding, and the body section 11 is further provided with the hoop winding. The helical winding increases the strength of the tank 50 in the direction of the center axis CX. The hoop winding increases the strength of the tank 50 in the radial direction. The tank 50 of FIG. 5 has the appearance having the hoop winding after the helical winding. In this embodiment, however, the order of the hoop winding and the helical winding is changeable. Moreover, the helical winding and the hoop winding may be performed alternately a plurality of times.

Figure 6:
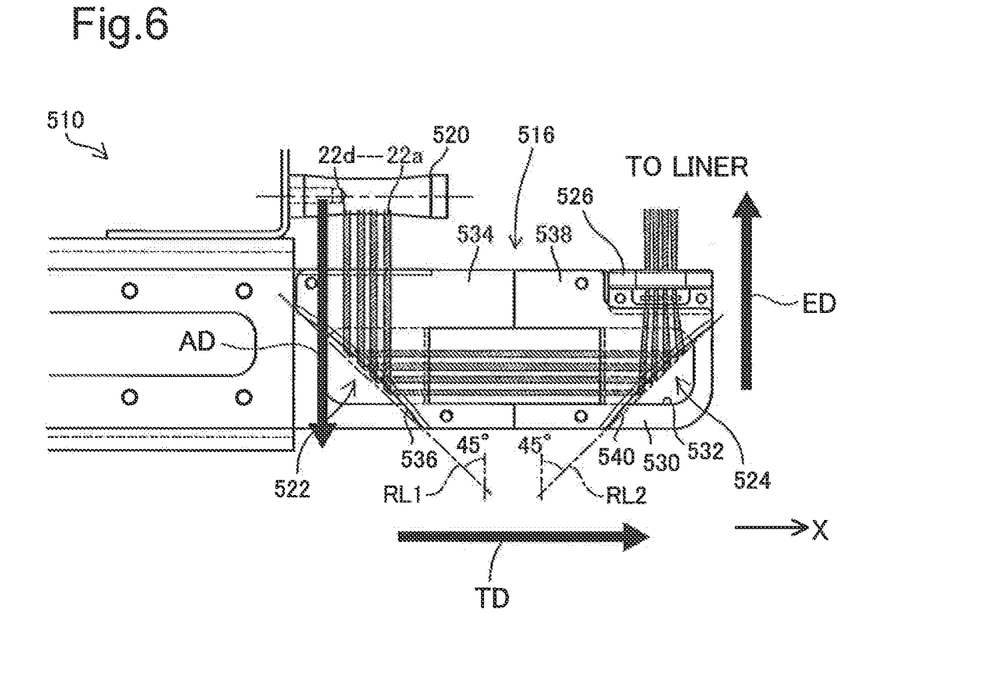
FIG. 6 is an enlarged diagram illustrating fiber-turn structures of the fiber-bundle guide assembly.

FIG. 6 is an enlarged diagram illustrating the turn guide unit 516 of the fiber-bundle guide assembly 510. The turn guide unit 516 includes a guide hole plate 530 having a guide hole 532 in an approximately rectangular shape with its longitudinal direction extending along the X-axis direction, and a first guide plate 534 and a second guide plate 538 which are provided along the X-axis direction on the guide hole plate 530.

The first guide plate 534 has a first guide edge 536 at a position in the guide hole 532 on the moving route of the fiber bundles 22 (22a-22d) that are supplied in parallel without overlapping each other from the slack suppressing shaft 520 to the turn guide unit 516. The first guide edge 536 is inclined with respect to the moving direction AD (hereinafter also called "approach direction AD") of the fiber bundles 22 (22a-22d) supplied to the turn guide unit 516. Further, the first guide edge 536 is formed to have a concaved shape that is curved relative to a linear reference line RL1, which is inclined by 45 degrees counterclockwise with respect to the approach direction AD of the fiber bundles 22. This concaved shape of the first guide edge 536 may be ark with a radius in the range of 100 mm to 300 mm. The guide hole 532 of the guide hole plate 530 and the first guide edge 536 of the first guide plate 534 constitute a first fiber-turn section 522.

The second guide plate 538 has a second guide edge 540 at a position in the guide hole 532 shifted in the X-axis direction from the position of the first guide edge 536. The second guide edge 540 is inclined in the direction reverse to the inclined direction of the first guide edge 536 with respect to the approach direction AD of the fiber bundles 22. Further, the second guide edge 540 is formed to have a concaved shape that is curved relative to a linear reference line RL2, which is inclined by 45 degrees clockwise with respect to the approach direction AD of the fiber bundles 22, i.e., inclined in the direction reverse to the inclined direction of the liner reference line RL1 of the first guide edge 536. The concaved shape of the second guide edge 540 may also be ark with a radius in the range of 100 mm to 300 mm. The guide edges 536 and 540 having such a concave shape will guide the plurality of fiber bundles 22a-22d supplied in parallel to the outer surface of the liner 10 in such a manner that the plurality of fiber bundles 22a-22d are respectively widened to have the expanded widths while being unspreaded not to increase the intervals between the adjacent fiber bundles 22a-22d, whereby enabling the fiber bundles 22a-22d to be wound on the liner 10 with high efficiency. The guide hole 532 of the guide hole plate 530 and the second guide edge 540 of the second guide plate 538 constitute a second fiber-turn section 524.

In the first fiber-turn section 522, the fiber bundles 22a-22d supplied from the slack suppressing shaft 520 to the turn guide unit 516 are turned by about 90 degrees by the first guide edge 536 of the first guide plate 534 to move in the X-axis direction. The moving direction of the fiber bundles 22a-22d turned by the first guide edge 536 may be called "turned direction TD". The first guide edge 536 is inclined with respect to both the approach direction AD and the turned direction TD of the fiber bundles 22a-22d.

When the fiber bundles 22a-22d are turned by the first guide edge 536, a tensile force is applied to the fiber bundles 22a-22d not only in the turned direction TD of the fiber bundles 22a-22d but in the width direction of the fiber bundles 22a-22d which is perpendicular to the turned direction TD. The fiber bundles 22a-22d each are accordingly widened to have the expanded widths by the turn at the first guide edge 536. The curved shape of the first guide edge 536 suppresses a spread of the intervals between the adjacent fiber bundles 22a-22d, associated with the width expansion by the turn.

In the second fiber-turn section 524, the fiber bundles 22a-22d moved from the first fiber-turn section 522 are further turned by about 90 degrees by the second guide edge 540, and then move in a substantially reverse direction ED to the approach direction AD of the fiber bundles 22a-22d, where the approach direction AD is the direction before the fiber bundles 22a-22d being turned by the first fiber-turn section 522. The moving direction ED of the fiber bundles 22a-22d turned by the second guide edge 540 may be called "exit direction ED". The second guide edge 540 is inclined with respect to both the turned direction TD and the exit direction ED of the fiber bundles 22a-22d.

When the fiber bundles 22a-22d are turned by the second guide edge 540, similarly, a tensile force is applied in the width direction of the fiber bundles 22a-22d to expand the widths of the fiber bundles 22a-22d. The curved shape of the second guide edge 540 suppresses a spread of the intervals between the adjacent fiber bundles 22a-22d associated with the fold-back, and makes the fiber bundles 22a-22d to gather on their center and array in parallel with each other.

The fiber bundles 22a-22d turned by the second fiber-turn section 524 are gathered by an outlet guide 526 provided on an end of the guide hole plate 530 on the moving route and are drawn toward the liner 10. The outlet guide 526 is a member having an opening defining the entire width of the fiber bundles 22a-22d.

As described above, the fiber-bundle guide assembly 510 of the embodiment expands the widths of the supplied fiber bundles 22a-22d when the fiber bundles 22a-22d are turned by the turn guide unit 516 having the configuration (also called "turn guide configuration") of turning the advancing direction of the fiber bundles 22a-22d by the first fiber-turn section 522 and the second fiber-turn section 524 into the opposite direction. This configuration suppresses a failure in expansion of the widths of the fiber bundles 22a-22d, and ensures the sufficient expansion of the widths of the fiber bundles 22a-22d.

Figure 7:
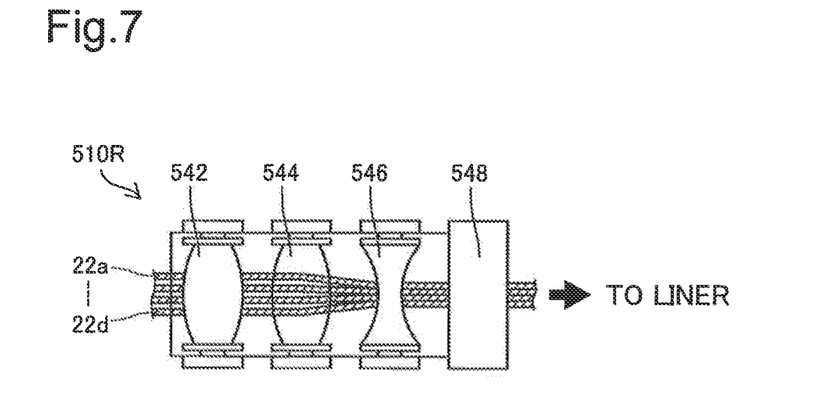
FIG. 7 is a diagram illustrating a fiber-bundle guide assembly of a comparative example.

FIG. 7 is a diagram illustrating a fiber-bundle guide assembly 510R of a comparative example. The fiber-bundle guide assembly 510R includes three rollers 542, 544 and 546 and an outlet guide 548 sequentially aligned along the moving direction of fiber bundles 22a-22d arrayed in parallel. The fiber bundles 22a-22d come into contact with the lower outer circumference of the first roller 542, the upper outer circumference of the second roller 544 and the lower outer circumference of the third roller 546, pass through the outlet guide 548, and are discharged and guided to a liner (not shown). The first and the second rollers 542 and 544 are widening rollers having a drum-like convex shape with a central part curved to be convexed along the direction of rotation axis perpendicular to the moving direction of the fiber bundles 22a-22d. The widening rollers 542 and 544 generate a width-direction tensile force in the width direction perpendicular to the moving direction of the fiber bundles 22a-22d from a moving-direction tensile force applied to the fiber bundles 22a-22d, and the width-direction tensile force expands the widths of the respective fiber bundles 22a-22d. The third roller 546 is a narrowing roller having a concave shape with a central part curved to be concaved along the direction of rotation axis perpendicular to the moving direction of the fiber bundles 22a-22d, and serves to unspread the fiber bundles 22a-22d to be gathered on their center and arrayed in parallel.

In the configuration of the fiber-bundle guide assembly 510R of the comparative example, the tensile force generated in the moving direction of the fiber bundles 22a-22d when passing through the three rollers 542, 544 and 546 is likely to change depending on the conditions of rotation and motion of the fiber-bundle guide assembly 510R in the course of winding the fiber bundles 22a-22d on the liner. This may cause a slack, a twist or a bias in the fiber bundles wound on the liner. This may also have the insufficient tensile force applied for expansion of the width of the fiber bundles and cause insufficient expansion of the width of the fiber bundles. As a result, this may lead to difficulty in stably winding the fiber bundles on the liner, in improving the performance of a resulting high-pressure gas tank, and in producing a high-pressure gas tank having the high strength, high quality and high dimensional accuracy.

In the fiber-bundle guide assembly 510 of the embodiment, on the other hand, the fiber bundles 22a-22d are turned by the first guide edge 536 of the first fiber-turn section 522 and the second guide edge 540 of the second fiber-turn section 524 of the turn guide unit 516. The first guide edge 536 and the second guide edge 540 accordingly serve to suppress a variation in the tensile force applied to the fiber bundles 22a-22d and suppress the occurrence of any slack, twist, and bias of the fiber bundle or an unevenness between the fiber bundles wound on the liner 10. This configuration also ensures the sufficient tensile force applied for expansion of the width of the fiber bundles. Accordingly, the FW apparatus of this embodiment is enable to stably hoop wind the fiber bundles on the liner, improve the performance of a resulting high-pressure gas tank, and thereby produce a high-pressure gas tank having the high strength, high quality and high dimensional accuracy.

Figure 8:
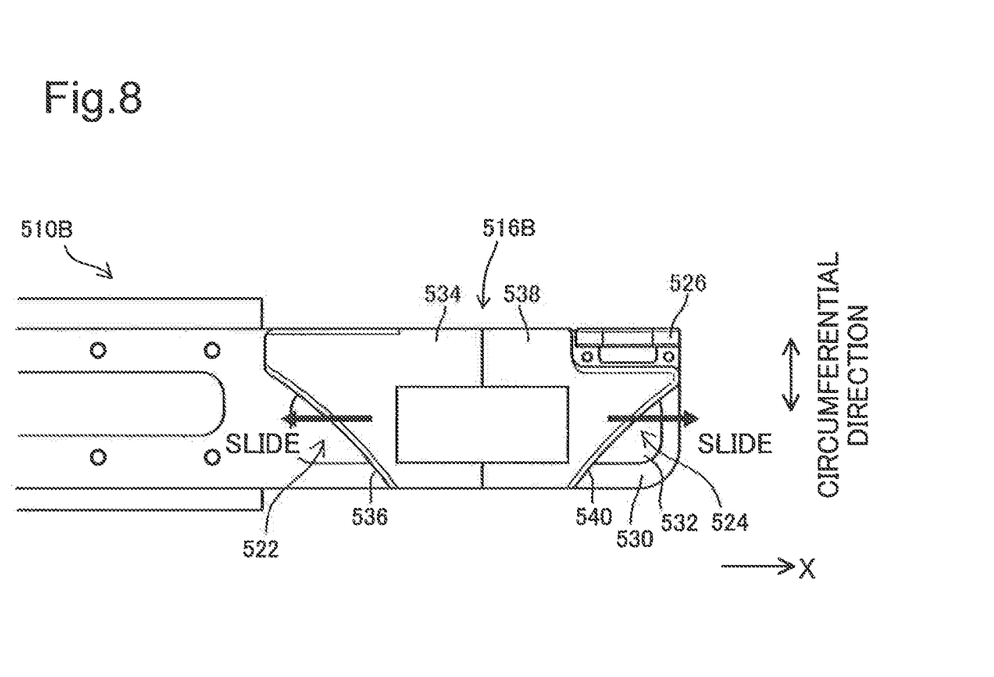
FIG. 8 is an enlarged diagram illustrating fiber-turn structures of a fiber-bundle guide assembly according to a modified embodiment.
Figure 9:
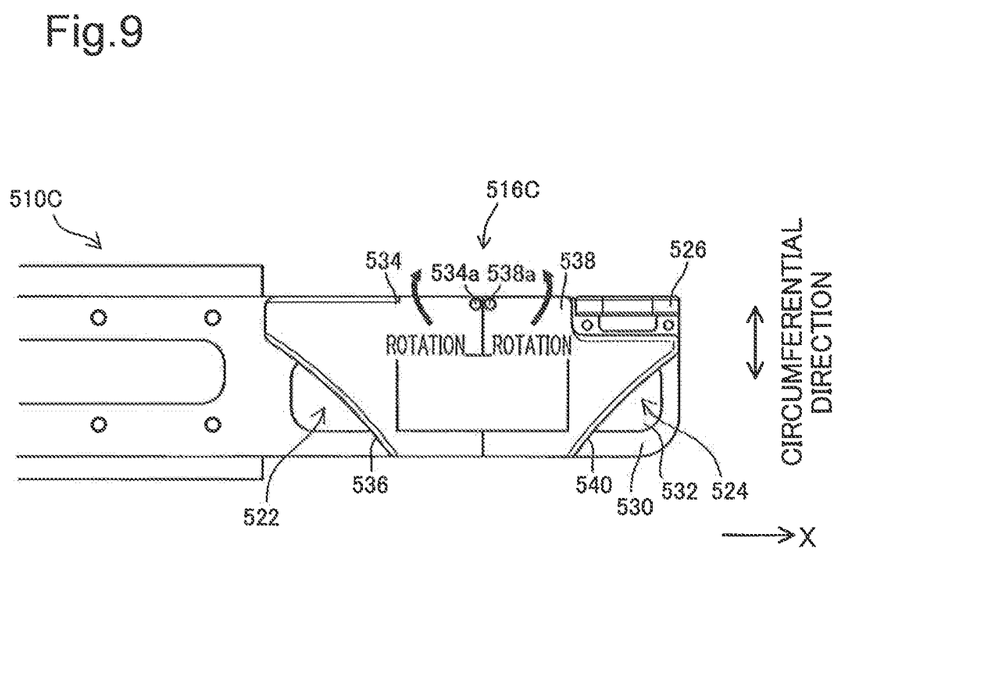
FIG. 9 is an enlarged diagram illustrating fiber-turn structures of a fiber-bundle guide assembly according to another modified embodiment.

FIG. 8 is an enlarged diagram illustrating a turn guide unit 516B of a fiber-bundle guide assembly 510B according to one modified embodiment. In this modified embodiment, the first guide plate 534 and the second guide plate 538 are configured to be slidable in the X-axis direction by drive mechanism (not shown), so as to adjust the positions of the first guide edge 536 and the second guide edge 540. This configuration is able to control the tensile force applied to the fiber bundles, thereby controlling the expansion of the widths of the fiber bundles. FIG. 9 is an enlarged diagram illustrating a turn guide unit 516C of a fiber-bundle guide assembly 510C according to another modified embodiment. In this modified embodiment, the first guide plate 534 and the second guide plate 538 are configured to be rotatable about respective rotating shafts 534a and 538a by drive mechanisms (not shown), so as to adjust the positions of the first guide edge 536 and the second guide edge 540. This configuration is also able to control the tensile force applied to the fiber bundles, thereby controlling the expansion of the widths of the fiber bundles. The configuration of FIG. 8 and that of FIG. 9 may be combined together such that the guide plates 534 and 538 (i.e. the guide edges 536 and 540) are configured to be slidable and rotatable.

It should be noted that the fiber bundles of the resin-impregnated fibers may have difficulty in expansion of the width by the tensile force in some environmental temperature conditions. For example, the resin to impregnate generally has the high viscosity in the low temperature condition, such as at room temperature, and tends to make it difficult to expand the width of the fiber bundles by a tensile force applied to the fiber bundles. Thus, by providing a heating mechanism, such as a heater, in the turn guide unit 516, it may be possible to improve the performance of expanding the width of the fiber bundles.

The hoop winding unit 500 of the above embodiment is described with the example of perform the hoop winding on the liner 10 by using the fiber bundles 22 (22a-22d) drawn from the four bobbins 506 (506a to 506d) held on the four holders 504 (504a-504d) provided on the annular plate 512 of the hoop winding head 502. However, the present invention is not limited to this example but applicable to another example of hoop winding on a liner of a tank by using fiber bundles drawn from a plurality of bobbins fixed to a plurality of holders. The present invention is also applicable to still another example of hoop winding on a liner of a tank by using a fiber bundle drawn from a bobbin held on one holder.

The invention is not limited to any of the embodiment and the modified embodiments described herein but may be implemented by a diversity of other configurations without departing from the scope of the invention. For example, the technical features of any of the embodiment and modified embodiments corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:

1. A filament winding apparatus that winds a fiber bundle on an outer surface of a liner of a tank, comprising:
   a hoop winding unit configured to hoop wind a plurality of fiber bundles on the outer surface of the liner by rotating along a circumferential direction of the liner while moving back and forth along an axial direction of the liner,
   the hoop winding unit including a fiber-bundle guide assembly configured to rotate along the circumferential direction of the liner during the moving back and forth of the hoop winding unit, and to guide the plurality of fiber bundles to the outer surface of the liner,
   wherein the fiber-bundle guide assembly includes:
      a first fiber-turn section configured to change a moving direction of the plurality of fiber bundles from an approach direction to a turned direction perpendicular to the approach direction, wherein the plurality of fiber bundles are supplied to the fiber-bundle guide assembly in the approach direction with a state where the plurality of fiber bundles are arrayed in parallel with each other in a width direction perpendicular to the approach direction; and a second fiber-turn section configured to change the moving direction of the plurality of fiber bundles from the turned direction to an exit direction which is reverse to the approach direction, and wherein the first fiber-turn section has a first guide edge inclined with respect to both the approach direction and the turned direction, and the second fiber-turn section has a second guide edge inclined with respect to both the turned direction and the exit direction.

2. The filament winding apparatus according to claim 1, wherein the first guide edge has a concave shape curved in a radius in a range of 100 mm to 300 mm, and the second guide edge has a concave shape curved in a radius in a range of 100 mm to 300 mm.

\* \* \* \* \*